United States Patent
Minami

(10) Patent No.: US 9,507,159 B2
(45) Date of Patent: ***Nov. 29, 2016

(54) LIGHT SOURCE DEVICE AND STEREOSCOPIC DISPLAY APPARATUS

(75) Inventor: Masaru Minami, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/069,183

(22) Filed: Mar. 22, 2011

(65) Prior Publication Data

US 2011/0242441 A1  Oct. 6, 2011

(30) Foreign Application Priority Data

Mar. 31, 2010  (JP) .................................. 2010-083098
Oct. 15, 2010  (JP) .................................. 2010-232753

(51) Int. Cl.
G02F 1/1335 (2006.01)
G02B 27/22 (2006.01)
G02B 5/02 (2006.01)
F21V 8/00 (2006.01)

(52) U.S. Cl.
CPC ......... *G02B 27/2214* (2013.01); *G02B 5/0215* (2013.01); *G02B 6/0043* (2013.01); *G02B 6/0036* (2013.01); *G02B 6/0068* (2013.01)
USPC ........................................................ 349/15

(58) Field of Classification Search
CPC ............ G02B 27/2214; G02B 5/0215; G02B 6/0043
USPC ...................... 349/13, 15, 61–68; 348/42–60
See application file for complete search history.

(56) References Cited

U.S. PATENT DOCUMENTS

| | | |
|---|---|---|
| 4,673,254 A | 6/1987 | Kato et al. |
| 5,575,549 A | 11/1996 | Ishikawa et al. |
| 5,816,677 A | 10/1998 | Kurematsu et al. |
| 5,897,184 A | 4/1999 | Eichenlaub et al. |
| 5,956,107 A * | 9/1999 | Hashimoto et al. ............ 349/64 |

(Continued)

FOREIGN PATENT DOCUMENTS

| | | |
|---|---|---|
| CN | 1729702 A | 2/2006 |
| CN | 1856720 A | 11/2006 |

(Continued)

OTHER PUBLICATIONS

U.S. Appl. No. 13/235,647, filed Nov. 19, 2011, Minami et al.

(Continued)

*Primary Examiner* — Dung Nguyen
(74) *Attorney, Agent, or Firm* — Wolf, Greenfield & Sacks, P.C.

(57) ABSTRACT

A light guide plate is described that includes a plurality of reflection areas and a plurality of scattering areas arranged to provide light to a display panel to display images with parallax. A display apparatus is described that can include a light guide plate comprising a plurality of scattering areas and a plurality of reflection areas arranged to form a parallax barrier, and a display panel that displays an image based on light received from the light guide plate. A display apparatus is described that can include a light guide plate comprising a plurality of scattering areas and a plurality of reflection areas arranged in an alternating pattern, and a display panel that displays an image based on light received from the light guide plate. An apparatus is described that includes a backlight positioned on a first side of the light guide plate.

21 Claims, 12 Drawing Sheets

(56) References Cited

U.S. PATENT DOCUMENTS

| | | | |
|---|---|---|---|
| 5,991,073 | A | 11/1999 | Woodgate et al. |
| 6,144,424 | A * | 11/2000 | Okuda et al. ............... 349/65 |
| 6,447,132 | B1 | 9/2002 | Harter, Jr. |
| 7,356,211 | B2 | 4/2008 | Sugiura et al. |
| 7,507,011 | B2 | 3/2009 | Ueno et al. |
| 7,525,531 | B2 * | 4/2009 | Ogiwara et al. ............ 345/103 |
| 7,671,935 | B2 * | 3/2010 | Mather ............ G02B 6/0038 349/62 |
| 7,920,226 | B2 | 4/2011 | Mather et al. |
| 8,033,706 | B1 | 10/2011 | Kelly et al. |
| 8,820,997 | B2 | 9/2014 | Minami |
| 8,821,001 | B2 | 9/2014 | Minami |
| 8,876,349 | B2 | 11/2014 | Minami |
| 8,950,923 | B2 | 2/2015 | Minami |
| 9,268,148 | B2 * | 2/2016 | Minami ............ G02B 5/0215 |
| 2006/0056791 | A1 | 3/2006 | Tzschoppe |
| 2008/0204550 | A1 | 8/2008 | De Zwart et al. |
| 2010/0091354 | A1 | 4/2010 | Nam et al. |
| 2010/0110340 | A1 | 5/2010 | Mather et al. |
| 2010/0157200 | A1 * | 6/2010 | Mun et al. ................. 349/65 |
| 2011/0205448 | A1 * | 8/2011 | Takata ..................... 348/739 |
| 2011/0242411 | A1 | 10/2011 | Auer et al. |
| 2012/0014136 | A1 | 1/2012 | Lee et al. |
| 2012/0075698 | A1 | 3/2012 | Minami |
| 2012/0105767 | A1 | 5/2012 | Choi et al. |
| 2012/0195072 | A1 | 8/2012 | Minami |
| 2012/0256974 | A1 | 10/2012 | Minami |
| 2012/0257406 | A1 | 10/2012 | Minami |
| 2012/0275183 | A1 | 11/2012 | Minami |
| 2012/0306861 | A1 | 12/2012 | Minami |
| 2013/0076999 | A1 | 3/2013 | Minami |
| 2013/0083260 | A1 | 4/2013 | Minami |
| 2013/0105767 | A1 | 5/2013 | Lin et al. |
| 2013/0114292 | A1 | 5/2013 | Brick et al. |
| 2014/0111714 | A1 | 4/2014 | Minami |
| 2014/0160562 | A1 | 6/2014 | Minami |
| 2014/0368907 | A1 | 12/2014 | Minami |

FOREIGN PATENT DOCUMENTS

| | | |
|---|---|---|
| JP | 62-029003 A | 7/1987 |
| JP | 01-241590 A | 9/1989 |
| JP | 03-011502 A | 1/1991 |
| JP | 08-327807 A | 12/1996 |
| JP | 10-097199 A | 4/1998 |
| JP | 10-508151 A | 4/1998 |
| JP | 2002-358812 A | 12/2002 |
| JP | 3565391 | 6/2004 |
| JP | 2004-240294 A | 8/2004 |
| JP | 2004-279815 A | 10/2004 |
| JP | 2005-078094 A | 3/2005 |
| JP | 2006-031941 A | 2/2006 |
| JP | 2006-511844 A | 4/2006 |
| JP | 2007-507071 A | 3/2007 |
| JP | 2007-187823 A | 7/2007 |
| JP | 2007-242336 A | 9/2007 |
| JP | 2007-272994 A | 10/2007 |
| JP | 2007-279224 A | 10/2007 |
| JP | 2008-309914 A | 12/2008 |
| JP | 2009-098566 A | 5/2009 |
| JP | 2009-176593 A | 8/2009 |
| JP | 2012-208500 A | 10/2012 |
| WO | 2010/024647 A2 | 3/2010 |

OTHER PUBLICATIONS

U.S. Appl. No. 14/177,613, filed Feb. 11, 2014, Minami et al.
U.S. Appl. No. 13/351,401, filed Oct. 3, 2013, Minami et al.
U.S. Appl. No. 14/138,236, filed Dec. 23, 2013, Minami et al.
U.S. Appl. No. 13/435,288, filed Mar. 30, 2012, Minami et al.
U.S. Appl. No. 13/435,374, filed Mar. 30, 2012, Minami et al.
U.S. Appl. No. 13/446,251, filed Apr. 13, 2012, Minami et al.
U.S. Appl. No. 13/608,083, filed Sep. 10, 2012, Minami et al.
U.S. Appl. No. 13/608,108, filed Sep. 10, 2012, Minami et al.
Extended European Search Report issued May 22, 2012 in connection with European Application No. 11191537.7.

* cited by examiner

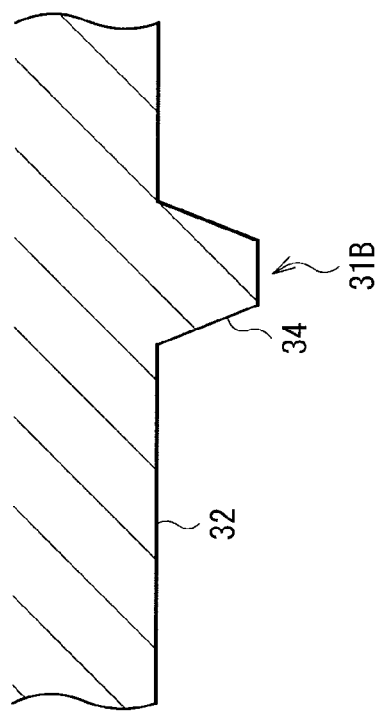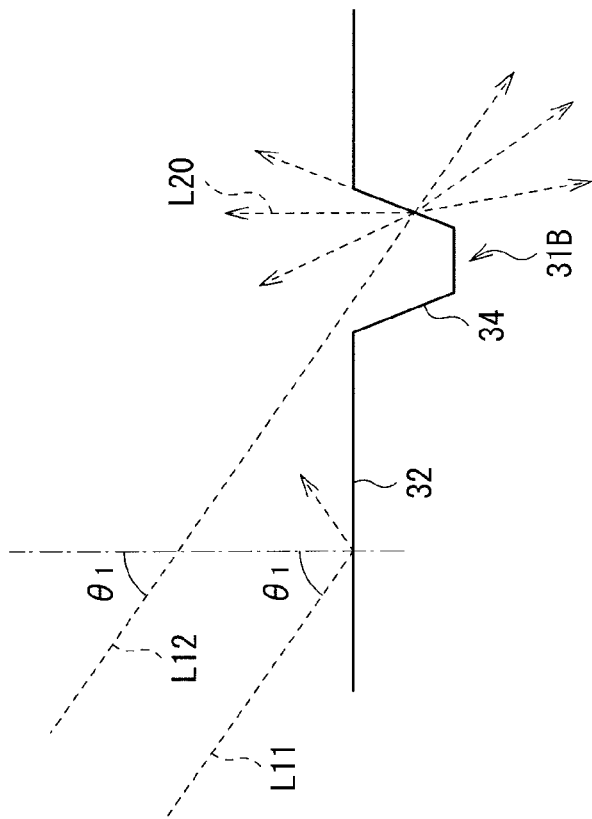
FIG. 12A
FIG. 12B

LIGHT SOURCE DEVICE AND STEREOSCOPIC DISPLAY APPARATUS

BACKGROUND OF THE INVENTION

Field of the Invention

The present invention relates to a light source device with a light guide plate arranged as a parallax barrier to enable stereoscopic vision, and a stereoscopic display apparatus using the light source device.

Description of Related Art

In the past, a parallax-barrier stereoscopic display apparatus has been known as one of stereoscopic display methods enabling stereoscopic vision with a naked eye without need of special eyeglasses. FIG. 14 shows a typical configuration example of a parallax-barrier stereoscopic display apparatus. In the stereoscopic display apparatus, a parallax barrier 101 is disposed facing a front face of a two-dimensional display panel 102. In a typical structure of the parallax barrier 101, shading portions 111 shading display image light from the two-dimensional display panel 102 and stripe openings (slit portions) 112 transmitting the display image light are alternately provided in a horizontal direction.

The two-dimensional display panel 102 displays images based on three-dimensional image data. For example, a plurality of parallax images different in parallax information from one another is prepared as three-dimensional image data, and, for example, a plurality of stripe-shaped, divided images extending in a vertical direction is cut out from each parallax image. The divided images are alternately arranged in a horizontal direction for the parallax images, and therefore a composite image, including a plurality of stripe-shaped parallax images in a screen, is formed, and displayed on the two-dimensional display panel 102. In the case of the parallax barrier type, the composite image displayed on the two-dimensional display panel 102 is viewed though the parallax barrier 101. Width of each divided image to be displayed or slit width of the parallax barrier 101 are appropriately set, and therefore when a viewer watches a stereoscopic display apparatus from a predetermined position or in a predetermined direction, light of different parallax images may be separately injected into left and right eyes 10L and 10R of the viewer through the slit portions 112. In this way, when a viewer watches a stereoscopic display apparatus from a predetermined position or in a predetermined direction, the viewer senses a stereoscopic image. To achieve stereoscopic vision, different parallax images need to be shown to the left eye 10L and the right eye 10R. Therefore, at least two parallax images, an image for right eye and an image for left eye, are desired. When at least three parallax images are used, multi view may be achieved. An increased number of parallax images enable stereoscopic vision in correspondence to change in position of a viewing point of a viewer. In other words, motion parallax is achieved.

The parallax barrier 101 is disposed in the front of the two-dimensional display panel 102 in the configuration example of FIG. 14. However, for example, when a transmissive liquid-crystal display panel is used, the parallax barrier 101 may be disposed in the back of the two-dimensional display panel 102 (see FIG. 10 of Japanese Patent Publication No. 3565391 and FIG. 3 of Japanese Unexamined Patent Application Publication No. 2007-187823). In this case, the parallax barrier 101 is disposed between the transmissive liquid-crystal display panel and a backlight, and therefore stereoscopic display may be achieved in accordance with the same principle as in the configuration example of FIG. 14.

SUMMARY OF THE INVENTION

However, the parallax-barrier stereoscopic display apparatus has a difficulty where since a special component for three-dimensional display, that is, parallax barrier, is necessary, a larger number of components and a wider layout space are desired compared with typical display apparatuses for two-dimensional display.

It is desirable to provide a light source device and a stereoscopic display apparatus, which are small in number of components compared with the parallax-barrier stereoscopic display apparatuses in the past so that space saving may be achieved.

Some embodiments relate to a light guide plate that includes a plurality of reflection areas and a plurality of scattering areas arranged to provide light to a display panel to display images with parallax.

Some embodiments relate to a display apparatus that includes a light source; a light guide plate that receives light from the light source, the light guide plate comprising a plurality of scattering areas and a plurality of reflection areas arranged to form a parallax barrier; and a display panel that displays an image based on light received from the light guide plate.

Some embodiments relate to a display apparatus that includes a light source; a light guide plate that receives light from the light source, the light guide plate comprising a plurality of scattering areas and a plurality of reflection areas arranged in an alternating pattern; and a display panel that displays an image based on light received from the light guide plate.

Some embodiments relate to an apparatus that includes a light source; a light guide plate that receives light from the light source, the light guide plate comprising a plurality of scattering areas and a plurality of reflection areas arranged to form a parallax barrier; and a backlight positioned on a first side of the light guide plate.

In the light source device or the stereoscopic display apparatus according to the embodiment of the invention, illumination light from the light source is completely internally reflected by the total-reflection areas in one or both of the first internal reflection surface and the second internal reflection surface of the light guide plate. Thus, illumination entering the total-reflection areas is completely internally reflected between the first internal reflection surface and the second internal reflection surface within the light guide plate. In the scattering areas, illumination light from the light source is scattered, and part or all of the scattered light is emitted outward of the light guide plate from a side of the first internal reflection surface. Thus, the light guide plate itself may have a function of a parallax barrier. In other words, the light guide plate may equivalently act as a parallax barrier with the scattering areas as opening portions (slit portions) and the total-reflection areas as shading portions.

According to the light source device or the stereoscopic display apparatus of the embodiment of the invention, since the total-reflection areas and the scattering areas are provided in one or both of the first internal reflection surface and the second internal reflection surface of the light guide plate, the light guide plate itself may equivalently have a function of a parallax barrier. Thus, the number of components may be reduced compared with parallax-barrier stereoscopic display apparatuses in the past, and thus space saving may be achieved.

Other and further objects, features and advantages of the invention will appear more fully from the following description.

BRIEF DESCRIPTION OF THE DRAWINGS

FIGS. 1A and 1B are section diagrams showing a configuration example of a stereoscopic display apparatus according to a first embodiment of the invention together with an emission state of beams from a light source device, wherein FIG. 1A shows a beam emission state in three dimensional display, and FIG. 1B shows a beam emission state in two dimensional display.

FIGS. 6A and 6B are section diagrams showing a configuration example of a stereoscopic display apparatus according to a second embodiment of the invention together with an emission state of beams from a light source device, wherein FIG. 6A shows a beam emission state in three dimensional display, and FIG. 6B shows a beam emission state in two dimensional display.

FIGS. 7A and 7B are section diagrams showing a configuration example of a stereoscopic display apparatus according to a third embodiment of the invention together with an emission state of beams from a light source device, wherein FIG. 7A shows a beam emission state in three dimensional display, and FIG. 7B shows a beam emission state in two dimensional display.

FIG. 12A is a section diagram showing a second configuration example of a surface of a light guide plate of the stereoscopic display apparatus shown in FIG. 8, and FIG. 12B is an explanatory diagram schematically showing beams in a reflective diffusion state on the surface of the light guide plate shown in FIG. 12A.

DETAILED DESCRIPTION OF THE PREFERRED EMBODIMENTS

Hereinafter, preferred embodiments of the invention will be described in detail with reference to drawings.

First Embodiment

General Configuration of Stereoscopic Display Apparatus

Figure 1A:
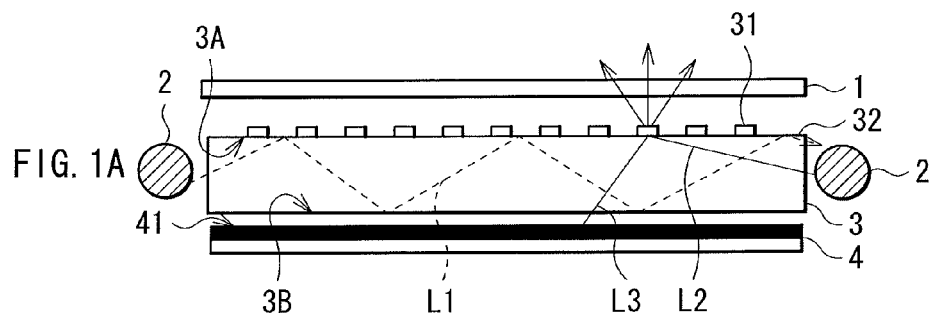
Figure 1B:
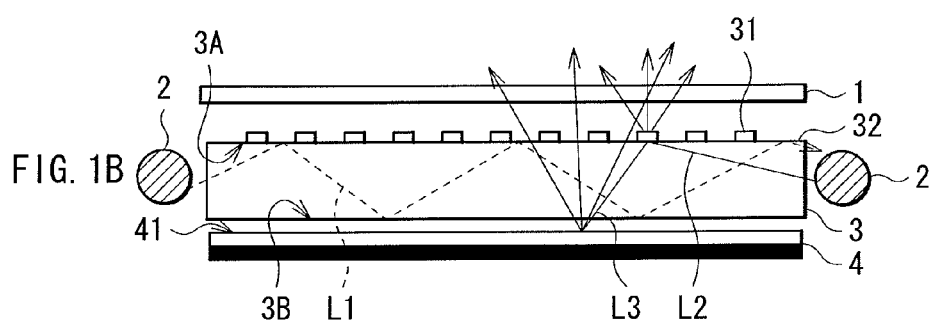

FIGS. 1A and 1B show a configuration example of a stereoscopic display apparatus according to a first embodiment of the invention. The stereoscopic display apparatus has a display section 1 performing image display, and a light source device provided on a back side of the display section 1 and emitting light for image display to the display section 1. The light source device has a light source 2, a light guide plate 3, and an electronic paper 4.

In the stereoscopic display apparatus, a full-screen two-dimensional (2D) display mode and a full-screen three-dimensional (3D) display mode may be optionally selectively changed from each other. FIG. 1A corresponds to a configuration in the three-dimensional display mode, and FIG. 1B corresponds to a configuration in the two-dimensional display mode. Moreover, FIGS. 1A and 1B schematically show an emission state of a beam from the light source device in each display mode.

Figure 14:
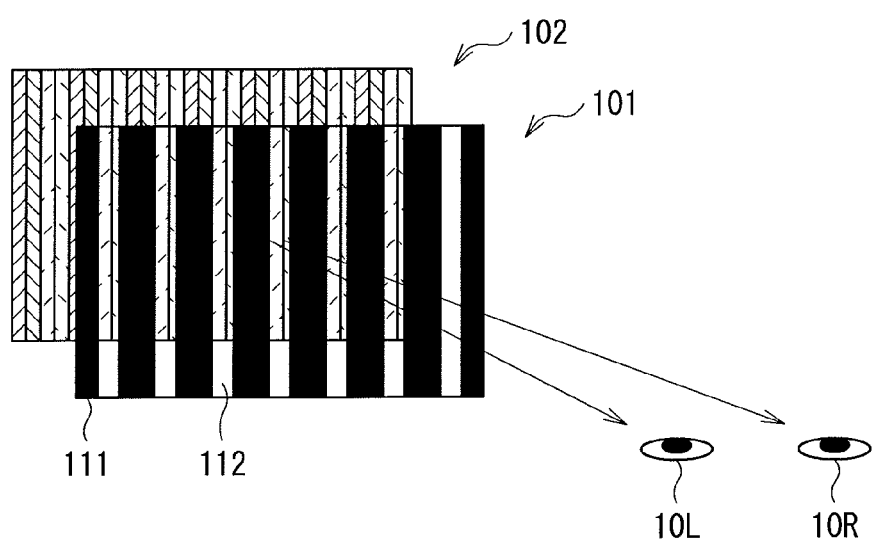
FIG. 14 is a configuration diagram showing a typical configuration example of a parallax-barrier stereoscopic display apparatus.

The display section 1 is configured of a transmissive two-dimensional display panel, for example, a transmissive liquid-crystal display panel, in which a plurality of pixels, including, for example, R (red) pixels, G (green) pixels and B (blue) pixels, are arranged in a matrix. The display section 1 modulates light from the light source device for each pixel depending on image data for performing two-dimensional image display. The display section 1 displays images based on three-dimensional image data and images based on two-dimensional image data in an optionally selectively changeable manner. The display apparatus switches between a three-dimensional display mode and a two-dimensional display mode. The three-dimensional image data includes, for example, a plurality of parallax images corresponding to a plurality of view angle directions in three-dimensional display. For example, when binocular three-dimensional display is performed, parallax image data for right-eye display and parallax image data for left-eye display are given as the image data. In the case of display in the three-dimensional display mode, for example, a composite image including a plurality of stripe-shaped, parallax images in a screen is formed and displayed as in the previous parallax-barrier stereoscopic display apparatus as shown in FIG. 14.

The electronic paper 4 is disposed on a side of the second internal reflection surface 3B of the light guide plate 3 so as to face the light guide plate 3. The electronic paper 4 is an optical device that is capable of switching between a light absorption mode and a reflective diffusion mode for an incident beam. Electronic paper 4 is an example of an optical device that is in a light absorption mode when the display apparatus is in the three-dimensional display mode and is in a reflective diffusion mode when the display apparatus is in the two-dimensional display mode. The electronic paper 4 is, for example, configured of a particle-movement display of an electrophoresis type or an electronic liquid powder type. In the particle-movement display, for example, positively charged black particles and, for example, negatively charged white particles are dispersed between a pair of substrates being opposed, and the particles are moved in response to voltage applied between the substrates for performing black or white display. In the electrophoresis method, particles are dispersed in a solution. In the electronic liquid powder type, particles are dispersed in a gas. The light absorption mode corresponds to a full-screen black display state of a display surface 41 of the electronic paper 4 as shown in FIG. 1A, and the reflective diffusion mode corresponds to a full-screen white display state of the display surface 41 of the electronic paper 4 as shown in FIG. 1B. When the display section 1 displays images based on three-dimensional image data (the display section 1 is in the three-dimensional display mode), the electronic paper 4 is set into the light absorption mode for an incident beam. When the display section 1 displays images based on two-dimensional image data (the display section 1 is in the two-dimensional display mode), the electronic paper 4 is set into the reflective diffusion mode for an incident beam.

The light source 2 is configured of, for example, a fluorescent lamp such as CCFL (Cold Cathode Fluorescent Lamp) or LED (Light Emitting Diode). At least one light source 2 is disposed on a side face of the light guide plate 3, and irradiates illumination light (beam L1) to the inside of the light guide plate 3 in a side face direction. FIGS. 1A and 1B show a configuration example where the light source 2 is disposed on each side face of the light guide plate 3.

The light guide plate 3 is configured of a transparent plastic plate such as an acrylic resin. The light guide plate 3 has a first internal reflection surface 3A opposed to a display section 1 side and the second internal reflection surface 3B opposed to an electronic paper 4 side. In this embodiment, the second side of the light guide plate (at 3B) has a flat surface. The light guide plate 3 guides light in a side face direction through total-internal-reflection between the first and second internal reflection surfaces 3A and 3B.

The second internal reflection surface 3B is mirror-polished over the whole area thereof to allow a beam L1, which is incident at an incident angle θ1 satisfying a total-reflection condition, to be internally reflected completely. The first internal reflection surface 3A has scattering areas 31 and total-reflection areas 32. In the first internal reflection surface 3A, the scattering areas 31 and the total-reflection areas 32 are alternately provided, for example, in a stripe pattern as a structure corresponding to a parallax barrier. In this example, the plurality of reflection areas and the plurality of scattering areas are arranged in an alternating pattern. As described later, it is structured that when the display section 1 is in the three-dimensional display mode, the scattering areas 31 act as opening portions (slit portions) of a parallax barrier, and the total-reflection areas 32 act as shading portions thereof. This is an example of a light guide place in which a plurality of reflection areas and the plurality of scattering areas are arranged in accordance with a parallax image.

Each total-reflection area 32 completely internally reflects a beam L1 incident at an incident angle θ1 satisfying a total-reflection condition (completely internally reflects a beam L1 incident at an incident angle θ1 larger than a predetermined critical angle α). Each scattering area 31 allows at least part of beams among incident beams L2, which are incident at an angle corresponding to the incident angle θ1 satisfying a predetermined total-reflection condition in the total-reflection area 32, to be emitted outward, (allows at least part of beams, which are incident at an angle corresponding to the incident angle θ1 larger than the predetermined critical angle α, to be emitted outward). Moreover, in the scattering area 31, another part of beams L3 in the incident beams L2 are internally reflected.

When it is assumed that a refractive index of the light guide plate 3 is n1, and a refractive index of a medium (air layer) outside of the light guide plate 3 is n0 (<n1), the critical angle α is expressed in the following. The angle α and θ1 are assumed to be an angle with respect to a normal to a surface of the light guide plate. The incident angle θ1 satisfying a total-reflection condition is expressed as θ1>α.

$$\sin \alpha = n0/n1$$

Specific Configuration Example of Scattering Area 31

Figure 2A:
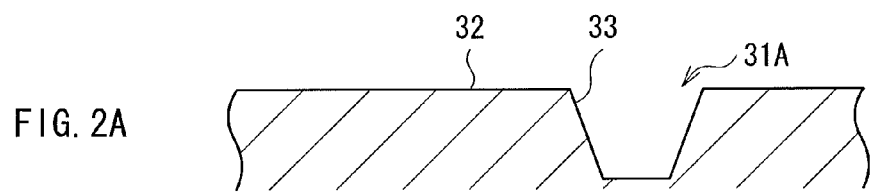
FIG. 2A is a section diagram showing a first configuration example of a surface of a light guide plate of the stereoscopic display apparatus shown in FIGS. 1A and 1B.
Figure 2B:
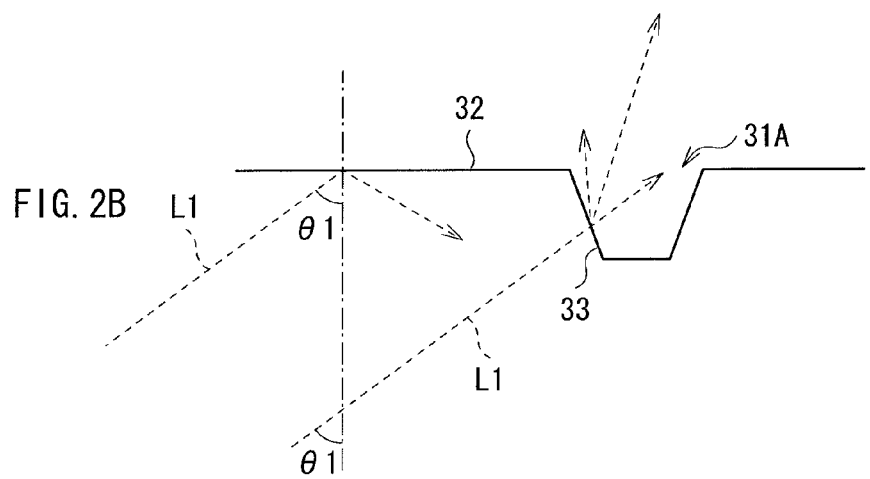
FIG. 2B is an explanatory diagram schematically showing a reflection state and a scattering state of beams on the surface of the light guide plate shown in FIG. 2A.

FIG. 2A shows a first configuration example of a surface of the light guide plate 3. FIG. 2B schematically shows a reflection state and a scattering state of a beam on the surface of the light guide plate 3 shown in FIG. 2A. In the first configuration example, the plurality of scattering areas 31 comprises a first scattering area 31A having a convex shape. In this example, each scattering area 31 has a convex shape. The scattering area 31 is formed as a scattering area 31A being concave with respect to the total-reflection areas 32. Such a concave shape may be formed by, for example, mirror-polishing the surface of the light guide plate 3, and then performing laser processing to portions corresponding to the scattering areas 31A. In the case of providing such a concave scattering area 31A, at least part of beams among incident beams, which are incident at an angle corresponding to the incident angle θ1 satisfying a predetermined total-reflection condition in the total-reflection area 32, do not satisfy the total-reflection condition at a side face portion 33 of the concave shape, and thus the part of beams are emitted outward.

Figure 3A:
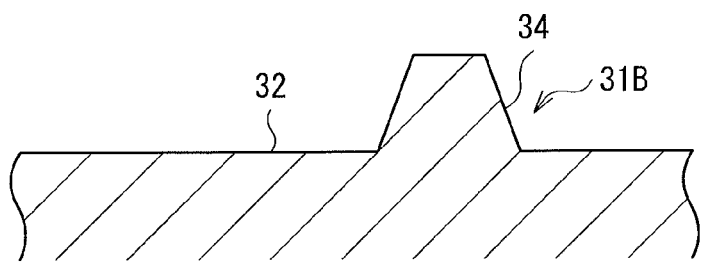
FIG. 3A is a section diagram showing a second configuration example of a surface of a light guide plate of the stereoscopic display apparatus shown in FIGS. 1A and 1B.
Figure 3B:
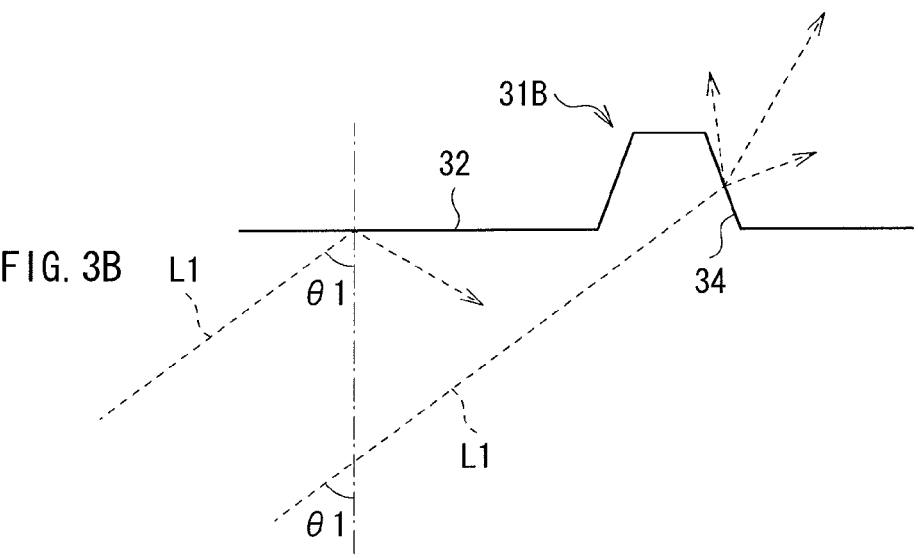
FIG. 3B is an explanatory diagram schematically showing a reflection state and a scattering state of beams on the surface of the light guide plate shown in FIG. 3A.

FIG. 3A shows a second configuration example of a surface of the light guide plate 3. FIG. 3B schematically shows a reflection state and a scattering state of a beam on the surface of the light guide plate 3 shown in FIG. 3A. In the second configuration example, the plurality of scattering areas 31 comprises a first scattering area 31B having a concave shape. In this example, each scattering area 31 has a concave shape. The scattering area 31 is formed as a scattering area 31B being convex with respect to the total-reflection area 32. Such a convex shape may be formed by, for example, molding the surface of the light guide plate 3 with a die. In this case, portions corresponding to the total-reflection areas 32, being formed in accordance with a surface configuration of the die, are mirror-polished. In the case of providing such a convex scattering area 31B, at least part of beams among incident beams, which are incident at an angle corresponding to the incident angle θ1 satisfying a predetermined total-reflection condition in the total-reflection area 32, do not satisfy the total-reflection condition at a side face portion 34 of the convex shape, and thus the part of beams are emitted outward.

Figure 4A:
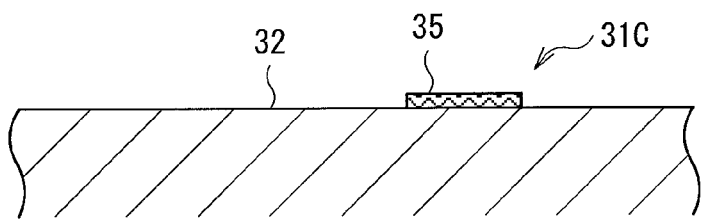
FIG. 4A is a section diagram showing a third configuration example of a surface of a light guide plate of the stereoscopic display apparatus shown in FIGS. 1A and 1B.
Figure 4B:
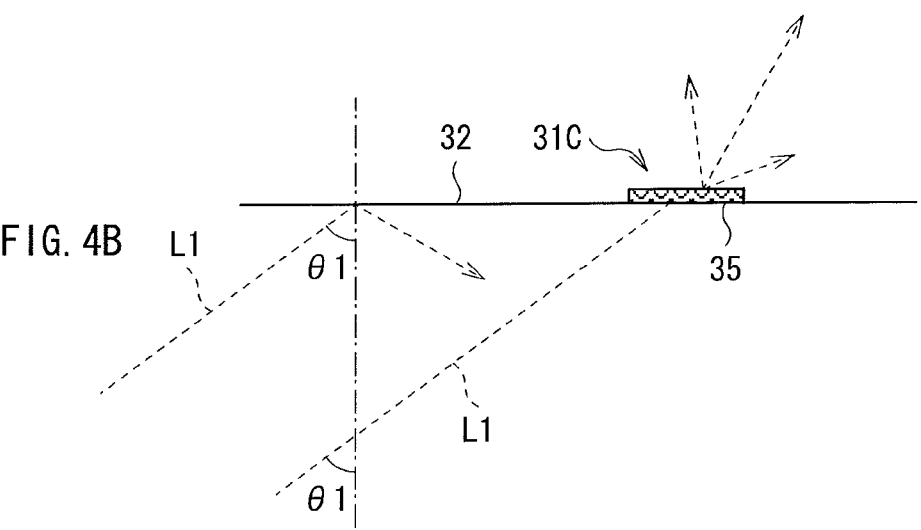
FIG. 4B is an explanatory diagram schematically showing a reflection state and a scattering state of beams on the surface of the light guide plate shown in FIG. 4A.

FIG. 4A shows a third configuration example of a surface of the light guide plate 3. FIG. 4B schematically shows a reflection state and a scattering state of a beam on the surface of the light guide plate 3 shown in FIG. 4A. In the configuration examples of FIGS. 2A and 3A, the surface of the light guide plate 3 is processed into a shape different from a shape of the total-reflection areas 32 to form the scattering areas 31. In contrast, scattering areas 31C according to the configuration example of FIG. 4A are not formed by surface processing, and are formed by disposing light diffusion members 35 on a surface of the light guide plate 3 corresponding to the first internal reflection surface 3A. In this example, the plurality of scattering areas 31 comprises a first scattering area 31 comprising a light diffusion member 35. For the light diffusion member 35, a member having a refractive index larger than that of the light guide plate 3, for example, PET resin having a refractive index of about 1.57 may be used. For example, a diffuser sheet including PET resin is attached to the surface of the light guide plate 3 with an acrylic adhesive, so that the scattering areas 31C are formed. In the case of such a scattering areas 31C formed by disposing the light diffusion members 35, at least part of beams among incident beams, which are incident at an angle corresponding to the incident angle θ1 satisfying a predetermined total-reflection condition in the total-reflection area 32, do not satisfy the total-reflection condition due to difference in refractive index between the light diffusion members 35 and the total-reflection areas 32, and thus the part of beams are emitted outward.

The above configuration examples are not limitative, and other configuration examples are considered for configurations of the scattering areas 31. For example, the scattering areas 31 may be formed by sandblasting portions corresponding to the scattering areas 31 in the surface of the light guide plate 3, coating the portions with paint, or the like.

Operation of Stereoscopic Display Apparatus

When the stereoscopic display apparatus performs display in the three-dimensional display mode (FIG. 1A), the display section 1 performs image display based on three-dimensional image data, and the display surface 41 of the electronic paper 4 is in a full-screen black display state (light absorption mode). In this state, a beam from the light source 2 is internally reflected completely in a repeated manner between the total-reflection areas 32 of the first internal reflection surface 3A and the second internal reflection surface 3B in the light guide plate 3, and therefore the beam is guided from one side face, on which the light source 2 is disposed, to the other, counter side face, and emitted from the other side face. On the other hand, among beams L2 entering the scattering area 31 of the first internal reflection surface 3A in the light guide plate 3, part of the beams, which deviate from the total-reflection condition, are emitted outward from the scattering area 31. Moreover, another part of beams L3 are internally reflected in the scattering area 31, and the beams L3 are incident into the display surface 41 of the electronic paper 4 through the second internal reflection surface 3B of the light guide plate 3. Since the display surface 41 of the electronic paper 4 is in a full-screen black display state, the beams L3 are absorbed by the display surface 41. As a result, beams are emitted only from the scattering areas 31 in the first internal reflection surface 3A of the light guide plate 3. In other words, the surface of the light guide plate 3 may equivalently act as a parallax barrier with the scattering areas 31 as opening portions (slit portions) and the total-reflection areas 32 as shading portions. Thus, three-dimensional display with a parallax barrier, where a parallax barrier is disposed on a back side of the display section 1, is equivalently performed.

When the stereoscopic display apparatus performs display in the two-dimensional display mode (FIG. 1B), the display section 1 performs image display based on two-dimensional image data, and the display surface 41 of the electronic paper 4 is in a full-screen white display state (reflective diffusion mode). In this state, a beam from the light source 2 is internally reflected completely in a repeated manner between the total-reflection areas 32 of the first internal reflection surface 3A and the second internal reflection surface 3B in the light guide plate 3, and therefore the beam is guided from one side face, on which the light source 2 is disposed, to the other, counter side face, and emitted from the other side face. On the other hand, among beams L2 entering the scattering area 31 of the first internal reflection surface 3A in the light guide plate 3, part of the beams, which deviate from the total-reflection condition, are emitted outward from the scattering area 31. Moreover, another part of beams L3 are internally reflected in the scattering area 31, and the beams L3 are incident into the display surface 41 of the electronic paper 4 through the second internal reflection surface 3B of the light guide plate 3. Since the display surface 41 of the electronic paper 4 is in a full-screen white display state, the beams L3 are scatter-reflected by the display surface 41. The scatter-reflected beams are incident into the light guide plate 3 again through the second internal reflection surface 3B, and incident angles of the beams deviate from the total-reflection condition in the total-reflection area 32, and thus the beams are emitted not only from the scattering areas 31 but also from the total-reflection area 32. As a result, beams are emitted from the whole area of the first internal reflection surface 3A of the light guide plate 3. In other words, the light guide plate 3 acts as a planar light source similar to a typical backlight. Thus, two-dimensional display with a backlight, where a typical backlight is disposed on a back side of the display section 1, is equivalently performed.

Figure 5:
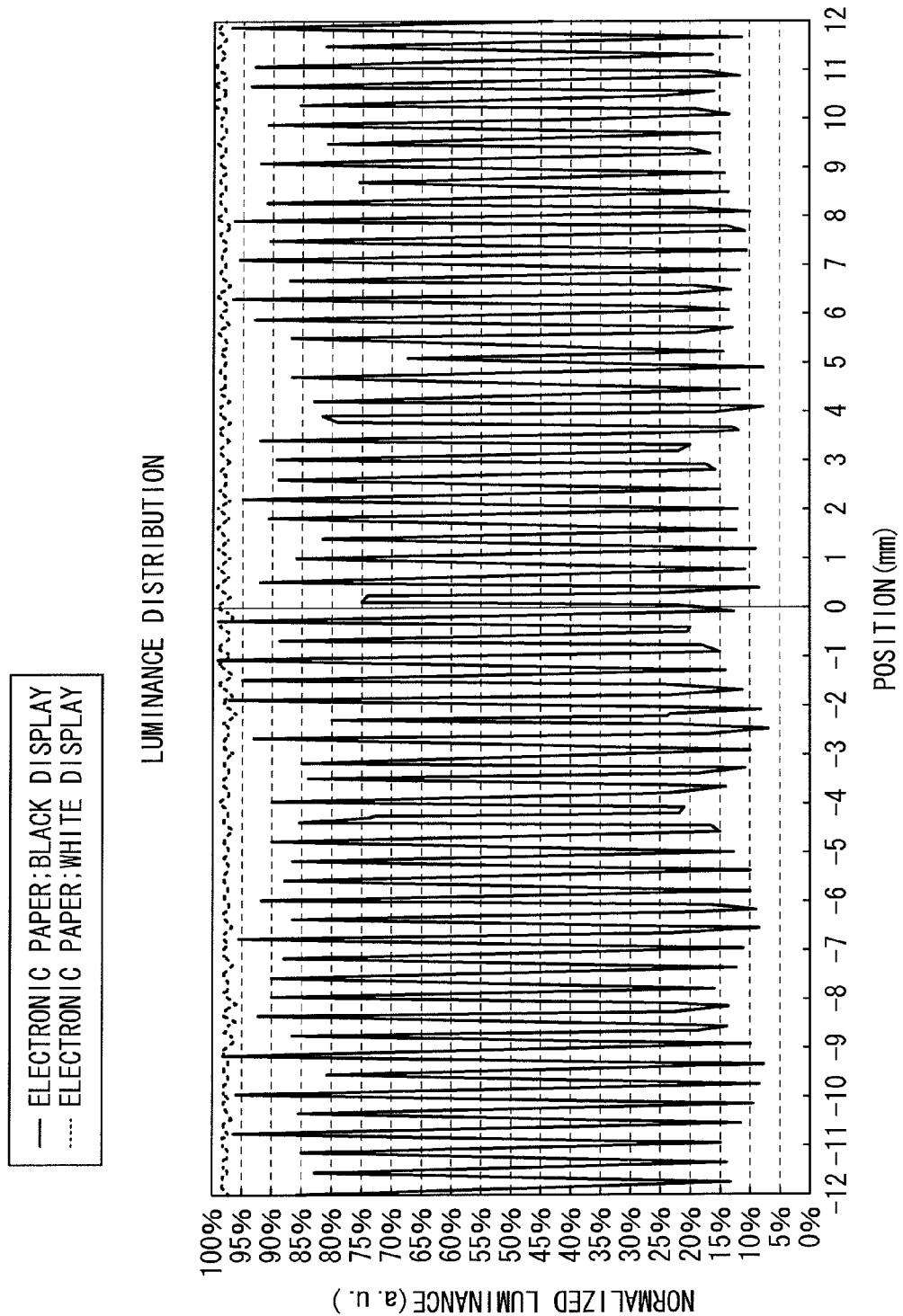
FIG. 5 is a characteristic diagram showing an example of luminance distribution on a surface of a display section in each of three-dimensional display and two-dimensional display of the stereoscopic display apparatus shown in FIGS. 1A and 1B.

FIG. 5 shows an example of luminance distribution on a surface of the display section 1 in each of three-dimensional display and two-dimensional display of the stereoscopic display apparatus shown in FIG. 1. Three-dimensional display corresponds to a black display state of the electronic paper 4, and two-dimensional display corresponds to a white display state thereof. In this case, the display section 1 displays a uniform image over the whole screen. A horizontal axis of FIG. 5 indicates a position (mm) in a horizontal direction on a screen of the display section 1, and a vertical axis indicates a normalized luminance value (arbitrary unit (a. u.)). As known from FIG. 5, uniform luminance is obtained over the whole screen in the white display state of the electronic paper 4. In the black display state of the electronic paper 4, luminance varies depending on a position, showing luminance distribution equivalent to luminance distribution in the case that a parallax barrier is disposed.

As described hereinbefore, according to the stereoscopic display apparatus using the light source device of the embodiment, since the total-reflection areas 32 and the scattering areas 31 are provided in the first internal reflection surface 3A of the light guide plate 3, the light guide plate 3 itself may equivalently have a function of a parallax barrier. Thus, the number of components may be reduced compared with the parallax-barrier stereoscopic display apparatuses in the past, leading to space saving. Moreover, the two-dimensional display mode and the three-dimensional display mode may be easily changed from each other only by changing a display state of the electronic paper 4.

Second Embodiment

Next, a stereoscopic display apparatus according to a second embodiment of the invention is described. Substantially the same components as in the stereoscopic display apparatus according to the first embodiment are marked with the same reference numerals or signs, and description of them is appropriately omitted.

Figure 6A:
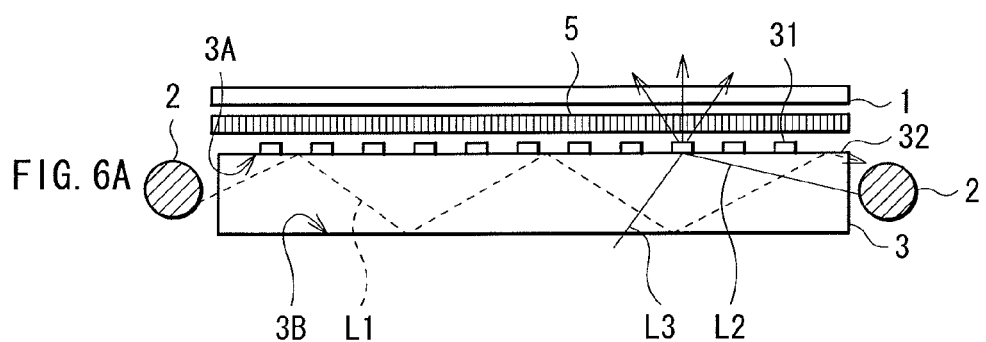
Figure 6B:
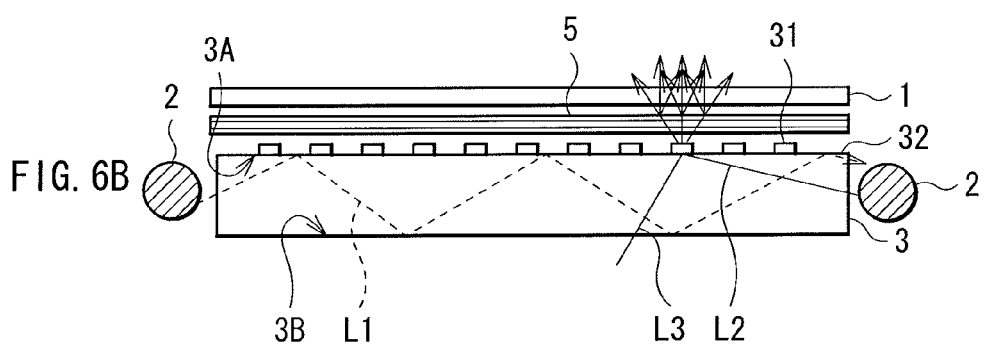

FIGS. 6A and 6B show a configuration example of a stereoscopic display apparatus according to the second embodiment of the invention. In the stereoscopic display apparatus, a two-dimensional display mode and a three-dimensional display mode may be optionally selectively changed from each other as in the stereoscopic display apparatus of FIGS. 1A and 1B. FIG. 6A corresponds to a configuration in the three-dimensional display mode, and FIG. 6B corresponds to a configuration in the two-dimensional display mode. Moreover, FIGS. 6A and 6B schematically show an emission state of a beam from a light source device in each display mode.

In the stereoscopic display apparatus, the light source device has a polymer diffuser plate 5 instead of the electronic paper 4 of the stereoscopic display apparatus of FIGS. 1A and 1B. Other configurations are the same as in the stereoscopic display apparatus of FIGS. 1A and 1B. The polymer diffuser plate 5 is configured of polymer-dispersed liquid crystal. The polymer diffuser plate 5 is disposed on a side of a first internal reflection surface 3A of the light guide plate 3 so as to face the light guide plate 3. The polymer diffuser plate 5 is an optical device that is capable of switching between a transparent mode and a transmissive diffusion mode for an incident beam, according to a voltage applied to a liquid layer. Polymer diffuser plate 5 is an example of an optical device that is in a transparent mode when the display apparatus is in the three-dimensional display mode and is in a transmissive diffusion mode when the display apparatus is in the two-dimensional display mode.

When the stereoscopic display apparatus performs display in the three-dimensional display mode (FIG. 6A), the display section 1 performs image display based on three-dimensional image data, and the polymer diffuser plate 5 is in the transparent mode over the whole area thereof. In this state, a beam from a light source 2 is internally reflected completely in a repeated manner between the total-reflection areas 32 of the first internal reflection surface 3A and the second internal reflection surface 3B in the light guide plate 3, and therefore the beam is guided from one side face, on which the light source 2 is disposed, to the other, counter side face, and emitted from the other side face. On the other hand, among beams L2 entering the scattering area 31 of the first internal reflection surface 3A in the light guide plate 3, part of the beams, which deviate from the total-reflection condition, are emitted outward from the scattering area 31. The beams emitted outward through the scattering area 31 are incident into the polymer diffuser plate 5. Since the polymer diffuser plate 5 is in the transparent mode over the whole area thereof, the beams transmits the polymer diffuser plate 5 and are incident into the display section 1 while keeping emission angles from the scattering area 31. Moreover, another part of beams L3 are internally reflected in the scattering area 31, and the beams L3 are emitted outward through the second internal reflection surface 3B of the light guide plate 3, and thus do not contribute to image display. As a result, beams are emitted only from the scattering areas 31 in the first internal reflection surface 3A of the light guide plate 3. In other words, the surface of the light guide plate 3 may equivalently act as a parallax barrier with the scattering areas 31 as opening portions (slit portions) and the total-reflection areas 32 as shading portions. Thus, three-dimensional display with a parallax barrier, where a parallax barrier is disposed on a back side of the display section 1, is equivalently performed.

When the stereoscopic display apparatus performs display in the two-dimensional display mode (FIG. 6B), the display section 1 performs image display based on two-dimensional image data, and the polymer diffuser plate 5 is in the transmissive diffusion mode over the whole area thereof. In this state, a beam from the light source 2 is internally reflected completely in a repeated manner between the total-reflection areas 32 of the first internal reflection surface 3A and the second internal reflection surface 3B in the light guide plate 3, and therefore the beam is guided from one side face, on which the light source 2 is disposed, to the other, counter side face, and emitted from the other side face. On the other hand, among beams L2 entering the scattering area 31 of the first internal reflection surface 3A in the light guide plate 3, part of the beams, which deviate from the total-reflection condition, are emitted outward from the scattering area 31. The beams emitted outward through the scattering area 31 are incident into the polymer diffuser plate 5. Since the polymer diffuser plate 5 is in the transmissive diffusion mode over the whole area thereof, the beams entering the display section 1 are diffused over the whole area of the polymer diffuser plate 5 by the diffuser plate. As a result, the light source device as a whole acts as a planar light source similar to a typical backlight. Thus, two-dimensional display with a backlight, where a typical backlight is disposed on a back side of the display section 1, is equivalently performed.

Third Embodiment

Next, a stereoscopic display apparatus according to a third embodiment of the invention is described. Substantially the same components as in the stereoscopic display apparatus according to the first or second embodiment are marked with the same reference numerals or signs, and description of them is appropriately omitted.

Figure 7A:
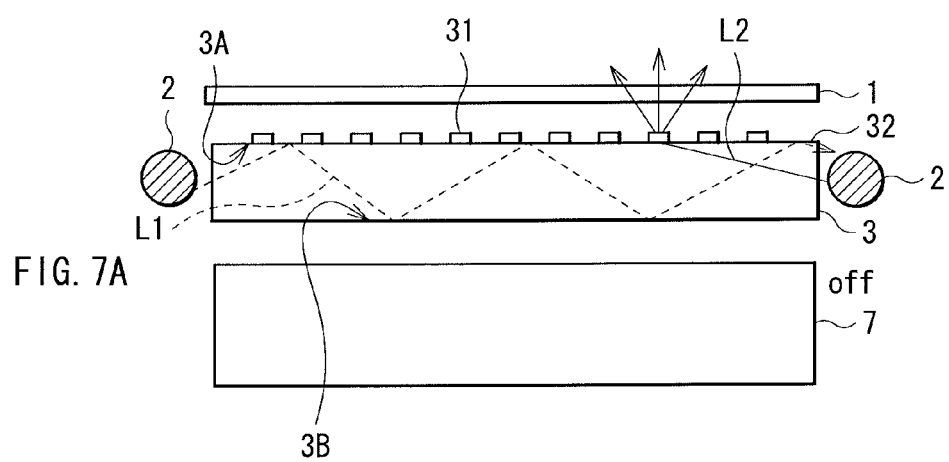
Figure 7B:
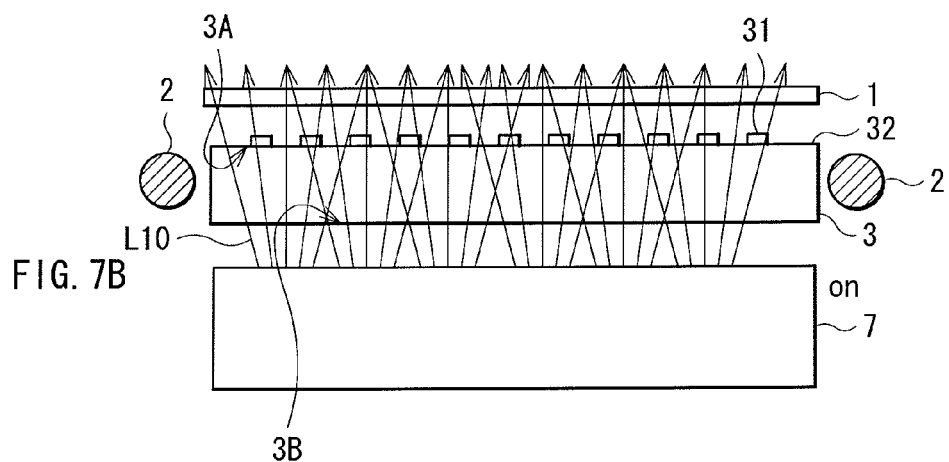

FIGS. 7A and 7B show a configuration example of a stereoscopic display apparatus according to the third embodiment of the invention. In the stereoscopic display apparatus, a two-dimensional display mode and a three-dimensional display mode may be optionally selectively changed from each other as in the stereoscopic display apparatus of FIGS. 1A and 1B. FIG. 7A corresponds to a configuration in the three-dimensional display mode, and FIG. 7B corresponds to a configuration in the two-dimensional display mode. Moreover, FIGS. 7A and 7B schematically show an emission state of a beam from a light source device in each display mode.

In the stereoscopic display apparatus, the light source device has a backlight 7 instead of the electronic paper 4 of the stereoscopic display apparatus of FIGS. 1A and 1B. Other configurations are the same as in the stereoscopic display apparatus of FIGS. 1A and 1B. In this example, backlight 7 is positioned on a first side of the light guide plate, the display panel is positioned on a second side of the light guide plate, and light source 2 is positioned on a third side of the light guide plate. The backlight 7 is a light source different from the light source 2 disposed on a side face of the light guide plate 3, and disposed on a side of the second internal reflection surface 3B of the light guide plate 3 so as to face the light guide plate 3. The backlight 7 irradiates illumination light to the second internal reflection surface 3B from an outer side. The backlight 7 is ON/OFF (lighting/non-lighting)-controlled in correspondence to switching between the two-dimensional display mode and the three-dimensional display mode. In this example, the light source 2 is a first light source that provides light to the light guide plate when the display apparatus is in the three-dimensional display mode, and the display apparatus also includes backlight 7 as a second light source that provides light to the light guide plate when the display apparatus is in the two-dimensional display mode.

When the stereoscopic display apparatus performs display in the three-dimensional display mode (FIG. 7A), the display section 1 performs image display based on three-dimensional image data, and the backlight 7 is in an OFF (non-lighting) state over the whole area thereof. The light source 2 disposed on a side face of the light guide plate 3 is in an ON (lighting) state. In this state, a beam from the light source 2 is internally reflected completely in a repeated manner between the total-reflection areas 32 of the first internal reflection surface 3A and the second internal reflection surface 3B in the light guide plate 3, and therefore the beam is guided from one side face, on which the light source 2 is disposed, to the other, counter side face, and emitted from the other side face. On the other hand, among beams L2 entering the scattering area 31 of the first internal reflection surface 3A in the light guide plate 3, part of the beams, which deviate from the total-reflection condition, are emitted outward from the scattering area 31. Moreover, another part of the beams are internally reflected in the scattering area 31, and the beams are emitted outward through the second internal reflection surface 3B of the light guide plate 3, and thus do not contribute to image display. As a result, beams are emitted only from the scattering areas 31 in the first internal reflection surface 3A of the light guide plate 3. In other words, the surface of the light guide plate 3 may equivalently act as a parallax barrier with the scattering areas 31 as opening portions (slit portions) and the total-reflection areas 32 as shading portions. Thus, three-dimensional display with a parallax barrier, where a parallax barrier is disposed on a back side of the display section 1, is equivalently performed.

When the stereoscopic display apparatus performs display in the two-dimensional display mode (FIG. 7B), the display section 1 performs image display based on two-dimensional image data, and the backlight 7 is in the ON (lighting) state over the whole area thereof. The light source 2 disposed on the side face of the light guide plate 3 is, for example, in the OFF (non-lighting) state. In this state, beams from the backlight 7 are approximately perpendicularly incident into the light guide plate 3 through the second internal reflection surface 3B. Therefore, incident angles of the beams deviate from the total-reflection condition in the total-reflection areas 32, and thus the beams are emitted outward not only from the scattering areas 31 but also from the total-reflection areas 32. As a result, beams are emitted from the whole area of the first internal reflection surface 3A of the light guide plate 3. In other words, the light guide plate 3 acts as a planar light source similar to a typical backlight. Thus, two-dimensional display with a backlight, where a typical backlight is disposed on a back side of the display section 1, is equivalently performed.

In the case of display in the two-dimensional display mode, the light source 2 disposed on the side face of the light guide plate 3 may be controlled to be ON (lighting) in addition to the backlight 7. Furthermore, in the case of display in the two-dimensional display mode, the light source 2 may be changed between the non-lighting state and the lighting state as necessary. Thus, for example, when only the backlight 7 is lit, and difference in luminance distribution still occurs between the scattering areas 31 and the total-reflection areas 32, a lighting state of the light source 2 is appropriately adjusted (ON/OFF-controlled or adjusted in quantity of lighting), and therefore luminance distribution may be optimized over the whole area.

Fourth Embodiment

Next, a stereoscopic display apparatus according to a fourth embodiment of the invention is described. Substantially the same components as in the stereoscopic display apparatuses according to the first to third embodiments are marked with the same reference numerals or signs, and description of them is appropriately omitted.

General Configuration of Stereoscopic Display Apparatus

While a configuration example where the scattering areas 31 and the total-reflection areas 32 are provided on the first internal reflection surface 3A side in the light guide plate 3, has been described in the first to third embodiments, a configuration where the areas are provided on the second internal reflection surface 3B side may be used. For example, in the configuration of the third embodiment (FIGS. 7A and 7B), the scattering areas 31 and the total-reflection areas 32 may be provided on a side of the second internal reflection surface 3B. As shown in FIGS. 7A and 7B, the plurality of reflection areas and a plurality of scattering areas are formed on a first side of the light guide plate (at 3B).

Figure 8:
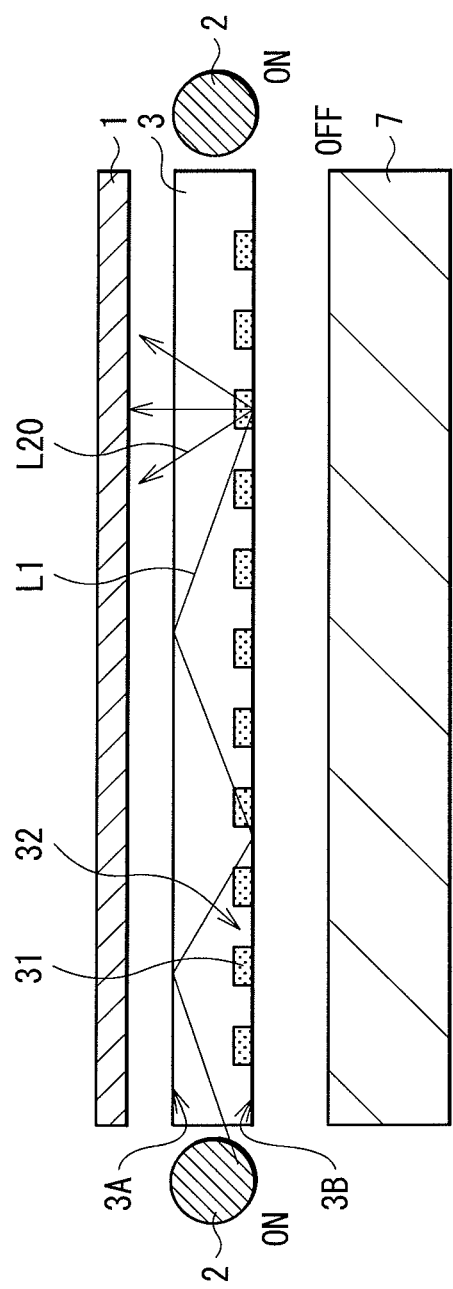
FIG. 8 is a section diagram showing a configuration example of a stereoscopic display apparatus according to a fourth embodiment of the invention together with an emission state of beams from a light source device when only a first light source is in an ON (lighting) state.
Figure 9:
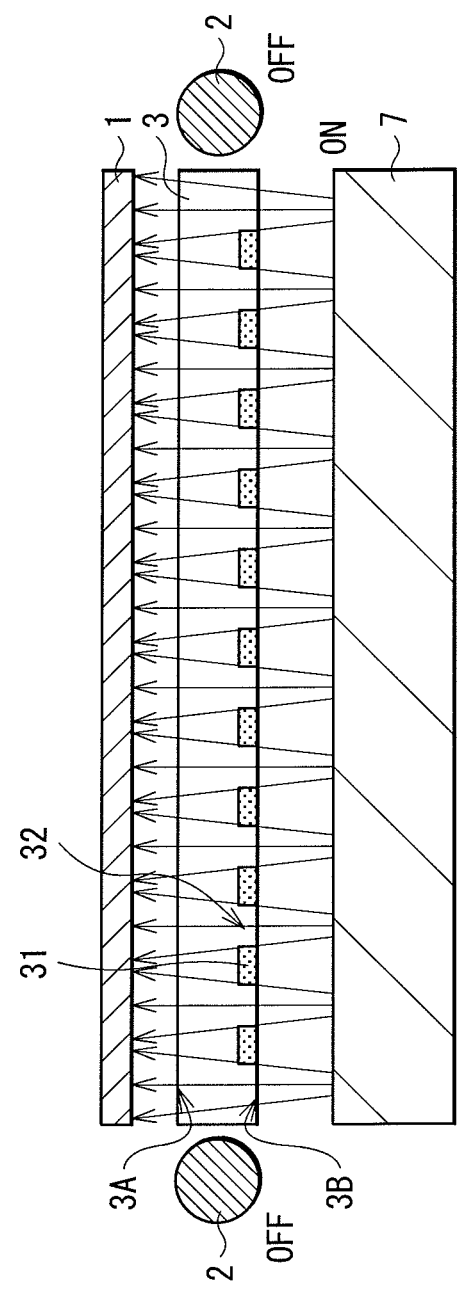
FIG. 9 is a section diagram showing the configuration example of the stereoscopic display apparatus shown in FIG. 8 together with an emission state of beams from the light source device when only a second light source is in an ON (lighting) state.
Figure 10:
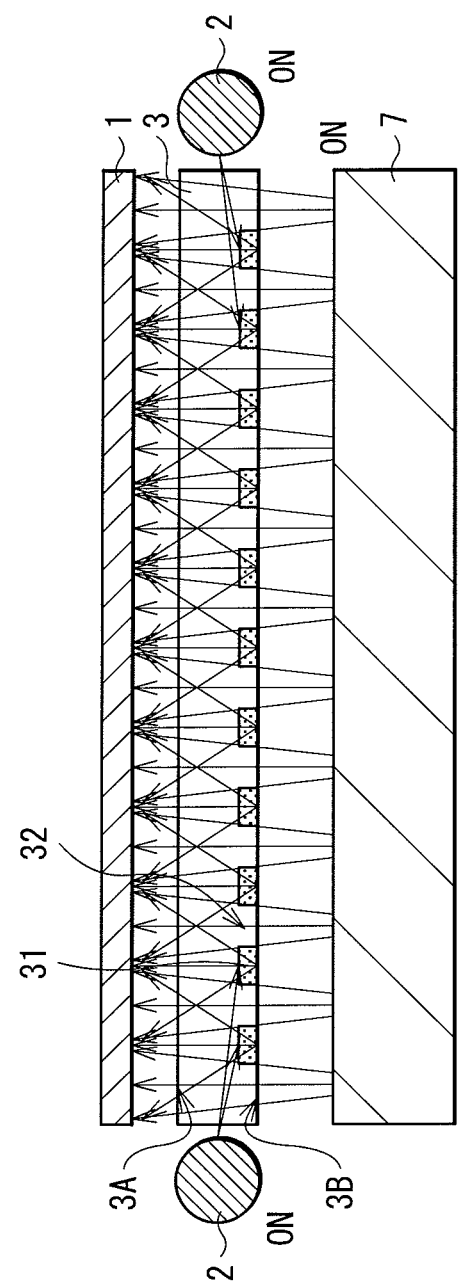
FIG. 10 is a section diagram showing the configuration example of the stereoscopic display apparatus shown in FIG. 8 together with an emission state of beams from the light source device when both the first and second light sources are in an ON (lighting) state.

FIGS. 8 to 10 show a configuration example of a stereoscopic display apparatus configured in such a way. In the stereoscopic display apparatus, the two-dimensional display mode and the three-dimensional display mode may be optionally selectively changed from each other by controlling a light source in the same way as in the stereoscopic display apparatus of FIGS. 7A and 7B. FIG. 8 schematically shows an emission state of beams from a light source device when only the light source 2 is in an ON (lighting) state, which corresponds to the three-dimensional display mode. FIG. 9 schematically shows an emission state of beams from a light source device when only the backlight 7 is in an ON (lighting) state, which corresponds to the two-dimensional display mode. FIG. 10 schematically shows an emission state of beams from a light source device when both the light source 2 and the backlight 7 are in an ON (lighting) state, which also corresponds to the two-dimensional display mode.

In the embodiment, the first internal reflection surface 3A of the light guide plate 3 is mirror-polished over the whole area thereof to allow a beam, which is incident at an incident angle satisfying a total-reflection condition inside of the light guide plate 3, to be internally reflected completely, and allow a beam, which deviates from the total-reflection condition, to be emitted outward. In this embodiment, side 3A of the light guide plate has a flat surface.

The second internal reflection surface 3B has scattering areas 31 and total-reflection areas 32. The scattering areas 31 are formed through processing of a surface of the light guide plate 3, such as laser processing, sand blasting or coating, or formed by attaching a sheet-like light scattering member to the surface. In the second internal reflection surface 3B, in the case of the three-dimensional display mode, the scattering areas 31 act as opening portions (slit portions) of a parallax barrier to first illumination light (beam L1) from the light source 2, and the total-reflection areas 32 act as shading portions thereof. In the second internal reflection surface 3B, the scattering areas 31 and the total-reflection areas 32 are provided with patterns so as to have a structure corresponding to a structure of the parallax barrier. In other words, the total-reflection areas 32 are provided with a pattern corresponding to shading portions of the parallax barrier, and the scattering areas 31 are provided with a pattern corresponding to opening portions of the parallax barrier. As a barrier pattern of the parallax barrier, for example, a stripe pattern is known, where a large number of longitudinal, slit-like openings are arranged in parallel in a horizontal direction with a shading portion between the respective openings. However, various types of barrier patterns, which have been known in the past, may be used without being limited to a particular pattern.

The first internal reflection surface 3A and the total-reflection areas 32 of the second internal reflection surface 3B completely internally reflect a beam incident at an incident angle $\theta 1$ satisfying a total-reflection condition (completely internally reflects a beam incident at an incident angle $\theta 1$ larger than a predetermined critical angle $\alpha$). Thus, first illumination light from the light source 2, incident at an incident angle $\theta 1$ satisfying the total-reflection condition, is guided in a side face direction by total-internal-reflection between the first internal reflection surface 3A and the total-reflection areas 32 of the second internal reflection surface 3B. As shown in FIG. 9 or 10, the total-reflection areas 32 transmit second illumination light from the backlight 7 so that the light is emitted to the first internal reflection surface 3A as beams deviating from the total-reflection condition.

As shown in FIG. 8, each scattering area 31 scatters and reflects the first illumination light (beam L1) from the light source 2 so that at least part of the first illumination light (scattered light L20) is emitted to the first internal reflection surface 3A as beams deviating from the total-reflection condition.

Specific Configuration Example of Scattering Area 31

Figure 11A:
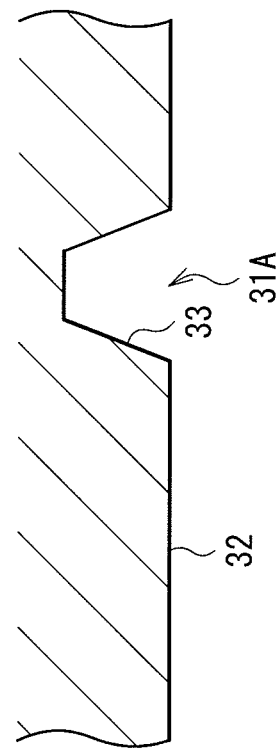
FIG. 11A is a section diagram showing a first configuration example of a surface of a light guide plate of the stereoscopic display apparatus shown in FIG. 8.
Figure 11B:
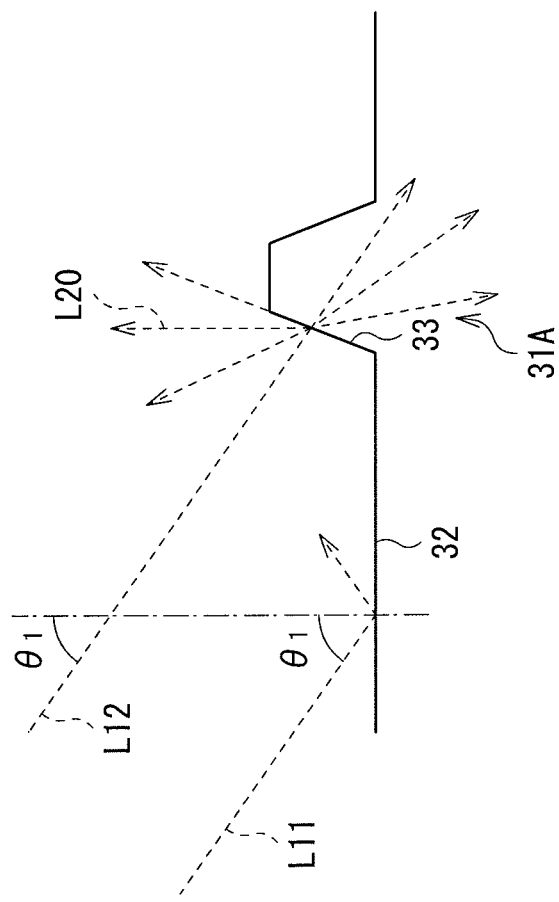
FIG. 11B is an explanatory diagram schematically showing beams in a reflective diffusion state on the surface of the light guide plate shown in FIG. 11A.

FIG. 11A shows a first configuration example of the second internal reflection surface 3B of the light guide plate 3. FIG. 11B schematically shows a reflection state and a scattering state of a beam on the second internal reflection surface 3B in the first configuration example shown in FIG. 11A. In the first configuration example, the scattering area 31 is formed as a scattering area 31A being concave with respect to the total-reflection area 32. Such a concave scattering area 31A may be formed through, for example, sand blasting or laser processing. For example, the scattering area 31A may be formed by mirror-polishing a surface of the light guide plate 3, and then performing laser processing to portions corresponding to the scattering areas 31. In the case of the first configuration example, first illumination light L11 from the light source 2, which is incident at an incident angle $\theta 1$ satisfying a total-reflection condition, is completely internally reflected by the total-reflection area 32 in the second internal reflection surface 3B. In the concave scattering area 31A, even if first illumination light L12 is incident at the same incident angle $\theta 1$ as in the total-reflection area 32, part of beams of the incident light L12 do not satisfy the total-reflection condition on a concave side-face portion 33, and therefore a portion of the beams are scattered and transmitted, and other portions of the beams are scattered and reflected. Part or all of the scatter-reflected beams (scattered light L20) are emitted to the first internal reflection surface 3A as beams deviating from the total-reflection condition as shown in FIG. 8.

FIG. 12A shows a second configuration example of the second internal reflection surface 3B of the light guide plate 3. FIG. 12B schematically shows a reflection state and a scattering state of a beam on the second internal reflection surface 3B in the second configuration example shown in FIG. 12A. In the second configuration example, the scattering areas 31 are formed as scattering areas 31B being convex with respect to the total-reflection areas 32. Such convex scattering areas 31B may be formed by, for example, molding a surface of the light guide plate 3 with a die. In this case, portions corresponding to the total-reflection areas 32, being formed in accordance with a surface configuration of the die, are mirror-polished. In the case of the second configuration example, first illumination light L11 from the light source 2, which is incident at an incident angle $\theta 1$ satisfying a total-reflection condition, is completely internally reflected by the total-reflection area 32 in the second internal reflection surface 3B. In the convex scattering areas 31B, even if first illumination light L12 is incident at the same incident angle $\theta 1$ as in the total-reflection areas 32, part of beams of the light L12 do not satisfy the total-reflection condition at a convex side-face portion 34, and a portion of the beams are scattered and transmitted, and other beams are scattered and reflected. Part or all of the scatter-reflected beams (scattered light L20) are emitted to the first internal reflection surface 3A as beams deviating from the total-reflection condition as shown in FIG. 8.

Figure 13A:
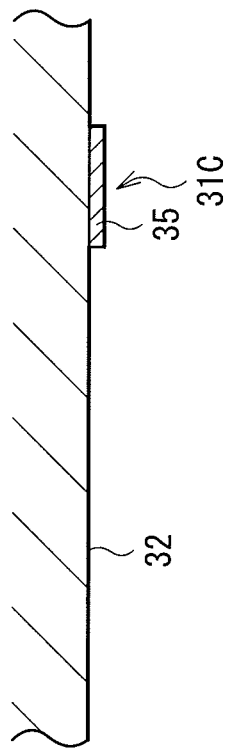
FIG. 13A is a section diagram showing a third configuration example of a surface of a light guide plate of the stereoscopic display apparatus shown in FIG. 8.
Figure 13B:
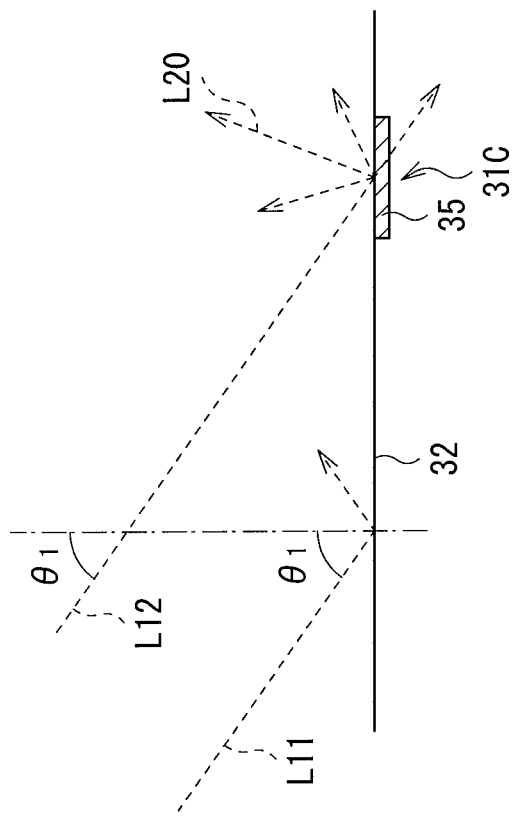
FIG. 13B is an explanatory diagram schematically showing beams in a reflective diffusion state on the surface of the light guide plate shown in FIG. 13A.

FIG. 13A shows a third configuration example of the second internal reflection surface 3B of the light guide plate 3. FIG. 13B schematically shows a reflection state and a scattering state of a beam on the second internal reflection surface 3B in the third configuration example shown in FIG. 13A. In the configuration examples of FIGS. 11A and 12A, the surface of the light guide plate 3 is processed into a shape different from a shape of the total-reflection areas 32 to form the scattering areas 31. In contrast, scattering areas 31C according to the configuration example of FIG. 13A are not formed by surface processing, and are formed by disposing light diffuser members 35, being made of a material different from a material of the light guide plate 3, on a surface of the light guide plate 3 corresponding to the second internal reflection surface 3B. In this case, as the light diffuser members 35, for example, white paint (including, for example, barium sulfate) is applied in a pattern on the surface of the light guide plate 3 by screen printing, so that the scattering areas 31C may be formed. In the case of the third configuration example, first illumination light L11 from the light source 2, which is incident at an incident angle $\theta 1$ satisfying a total-reflection condition, is completely internally reflected by the total-reflection areas 32 in the second internal reflection surface 3B. In the scattering areas 31C, where the light diffuser members 35 are disposed, even if first illumination light L12 is incident at the same incident angle $\theta 1$ as in the total-reflection areas 32, part of beams of the light L12 are scattered and transmitted by the light diffuser members 35, and other beams are scattered and reflected. Part or all of the scatter-reflected beams are emitted to the first internal reflection surface 3A as beams deviating from the total-reflection condition.

Operation of Stereoscopic Display Apparatus

When the stereoscopic display apparatus performs display in the three-dimensional display mode, the display section 1 performs image display based on three-dimensional image data, and the light source 2 and the backlight 7 are ON/OFF (lighting/non-lighting)-controlled for three-dimensional display. Specifically, the light source 2 is controlled to be ON (lighting), and the backlight 7 in an OFF (non-lighting) state as shown in FIG. 8. In this state, first illumination light (beam L1) from the light source 2 is internally reflected completely in a repeated manner between the first internal reflection surface 3A and the total-reflection areas 32 of the second internal reflection surface 3B in the light guide plate 3, and therefore the light is guided from one side face, on which the light source 2 is disposed, to the other, counter side face, and emitted from the other side face. On the other hand, part of first illumination light from the light source 2 is scattered and reflected by the scattering area 31 of the light guide plate 3, and therefore the light transmits the first internal reflection surface 3A, and is emitted outward of the light guide plate 3. Thus, the light guide plate itself may have a function of a parallax barrier. In other words, the light guide plate may equivalently act as a parallax barrier with the scattering areas 31 as opening portions (slit portions) and the total-reflection areas 32 as shading portions to the first illumination light from the light source 2. Thus, three-dimensional display with a parallax barrier, where a parallax barrier is disposed on a back side of the display section 1, is equivalently performed.

When display is performed in the two-dimensional display mode, the display section 1 performs image display based on two-dimensional image data, and the light source 2 and the backlight 7 are ON/OFF (lighting/non-lighting)-controlled for two-dimensional display. Specifically, the light source 2 is controlled to be OFF (non-lighting), and the backlight 7 is controlled to be ON (lighting) as shown in FIG. 9. In this case, second illumination light from the backlight 7 transmits the total-reflection area 32 of the second internal reflection surface 3B, and therefore the light is emitted outward of the light guide plate 3 from approximately the whole area of the first internal reflection surface 3A as beams deviating from the total-reflection condition. In other words, the light guide plate 3 acts as a planar light source similar to a typical backlight. Thus, two-dimensional display with a backlight, where a typical backlight is disposed on a back side of the display section 1, is equivalently performed.

Even if only the backlight 7 is lit, the second illumination light is emitted from approximately the whole area of the light guide plate 3. However, the light source 2 may also be lit as shown in FIG. 10 as necessary. Thus, for example, when only the backlight 7 is lit, and difference in luminance distribution still occurs between the scattering areas 31 and the total-reflection areas 32, a lighting state of the light source 2 is appropriately adjusted (ON/OFF-controlled or adjusted in quantity of lighting), and therefore luminance distribution may be optimized over the whole area. However, in the case of two-dimensional display, for example, when luminance correction is adequately performed by the display section 1, only the backlight 7 can be lit.

As described hereinbefore, according to the stereoscopic display apparatus using the light source device of the embodiment, the scattering areas 31 and the total-reflection areas 32 are provided in the second internal reflection surface 3B of the light guide plate 3, and the first illumination light from the light source 2 and the second illumination light from the backlight 7 may be selectively emitted outward of the light guide plate 3, therefore the light guide plate 3 itself may equivalently have a function of a parallax barrier.

Other Embodiments

The invention is not limited to the above embodiments, and various modifications and alterations may be made. For example, while the embodiments have been shown with a configuration example where the scattering areas 31 and the total-reflection areas 32 are provided in one of the first and second internal reflection surfaces 3A and 3B, it may be configured that the scattering areas 31 and the total-reflection areas 32 are provided in each of the first and second internal reflection surfaces 3A and 3B.

The present application contains subject matter related to that disclosed in Japanese Priority Patent Application JP 2010-083098 filed in the Japan Patent Office on Mar. 31, 2010 and Japanese Priority Patent Application JP 2010-232753 filed in the Japan Patent Office on Oct. 15, 2010, the entire content of which is hereby incorporated by references.

It should be understood by those skilled in the art that various modifications, combinations, sub-combinations and alterations may occur depending on design requirements and other factors insofar as they are within the scope of the appended claims or the equivalent thereof.

What is claimed is:

1. A display apparatus configured to operate in a three-dimensional display mode and a two-dimensional display mode, the display apparatus comprising:
   a three-dimensional display mode light source controlled to be activated and to provide light to the light guide plate when the display apparatus is in the three-dimensional display mode;
   a light guide plate that receives light from the three-dimensional display mode light source, the light guide plate comprising a plurality of scattering areas and a plurality of reflection areas arranged in an alternating pattern such that the plurality of scattering areas alternate with the plurality of reflection areas in a horizontal direction;
   a display panel that displays an image based on light received from the light guide plate; and
   a two-dimensional display mode backlight positioned on a first plane,
   wherein the display panel is positioned on a second plane that is opposite the first plane relative to the light guide plate, and
   wherein the three-dimensional display mode light source is positioned between the first plane and the second plane.

2. The display apparatus of claim 1, wherein the plurality of scattering areas and the plurality of reflection areas are arranged in a stripe pattern.

3. The display apparatus of claim 1, wherein the display apparatus switches between a three-dimensional display mode and a two-dimensional display mode, and the display apparatus is free of a filter array or parallax barrier between the two-dimensional display mode backlight and the light guide plate.

4. The display apparatus of claim 3, wherein the three-dimensional display mode light source is a first light source, and the two-dimensional display mode backlight is a second light source controlled to be activated and to provide light to the light guide plate when the display apparatus is in the two-dimensional display mode.

5. The display apparatus of claim 1, wherein the plurality of scattering areas are positioned on a first side of the light guide plate.

6. The display apparatus of claim 1, wherein each scattering area has a concave shape.

7. The display apparatus of claim 1, wherein the plurality of scattering area comprises a first scattering area having a convex shape.

8. The display apparatus of claim 1, wherein the plurality of scattering areas comprises a first scattering area having a concave shape.

9. The display apparatus of claim 1, wherein the plurality of scattering areas comprises a first scattering area comprising a light diffusion member.

10. The display apparatus of claim 1, wherein the plurality of reflection areas and the plurality of scattering areas are positioned on a side of the light guide plate facing the display panel.

11. The display apparatus of claim 1, wherein the display panel comprises a transmissive display panel.

12. The display apparatus of claim 11, wherein the transmissive display panel comprises a liquid crystal display panel.

13. A display apparatus configured to operate in and switch between a three-dimensional display mode and a two-dimensional display mode, the display apparatus comprising:
    a three-dimensional display mode light source controlled to be activated and to provide light to the light guide plate when the display apparatus is in the three-dimensional display mode;
    a light guide plate that receives light from the three-dimensional display mode light source, the light guide plate comprising a plurality of scattering areas and a plurality of reflection areas arranged in an alternating pattern such that the plurality of scattering areas alternate with the plurality of reflection areas in a horizontal direction; and
    a display panel that displays an image based on light received from the light guide plate,
    wherein the three-dimensional display mode light source is a first light source that provides light to the light guide plate when the display apparatus is in the three-dimensional display mode and is positioned between a first plane and a second plane, the second plane being opposite the first plane relative to the light guide plate,
    wherein the display apparatus further comprises:
        a two-dimensional display mode light source controlled to be activated and to provide light to the light guide plate when the display apparatus is in the two-dimensional display mode, and
    wherein the two-dimensional display mode light source is positioned on the first plane and the display panel is positioned on the second plane.

14. The display apparatus of claim 13, wherein the plurality of scattering areas and the plurality of reflection areas are arranged in a stripe pattern.

15. The display apparatus of claim 13, wherein the display apparatus is free of a filter array or parallax barrier between the two-dimensional display mode light source and the light guide plate.

16. The display apparatus of claim 15, wherein the plurality of scattering areas are positioned on a first side of the light guide plate.

17. The display apparatus of claim 13, wherein the plurality of scattering areas comprises a first scattering area having a convex shape.

18. The display apparatus of claim 13, wherein the plurality of scattering areas comprises a first scattering area having a concave shape.

19. The display apparatus of claim 13, wherein the plurality of scattering areas comprises a first scattering area comprising a light diffusion member.

20. The display apparatus of claim 13, wherein the plurality of reflection areas and the plurality of scattering areas are positioned on a side of the light guide plate facing the display panel.

21. The display apparatus of claim 13, wherein the display panel comprises a transmissive display panel.

* * * * *